United States Patent [19]

Strehler

[11] Patent Number: 4,891,602
[45] Date of Patent: Jan. 2, 1990

[54] VISUAL/VOICE INPUT RECOGNITION SENSOR

[76] Inventor: Bernard Strehler, 2235 25th St., #217, San Pedro, Calif. 90732

[21] Appl. No.: 1,161

[22] Filed: Jan. 7, 1987

[51] Int. Cl.$^4$ .............................................. H03K 5/00
[52] U.S. Cl. ...................................... 381/45; 358/209
[58] Field of Search ...................... 381/36, 37, 40, 41, 381/42, 43, 45, 46; 364/513, 513.5; 329/140–143, 146, 129, 136; 358/290, 212, 213.28, 903

[56] References Cited

U.S. PATENT DOCUMENTS

| | | | |
|---|---|---|---|
| 3,997,797 | 12/1976 | Sahara et al. | 329/140 |
| 4,383,135 | 5/1983 | Scott et al. | 381/45 |
| 4,758,794 | 7/1988 | Ogawa | 329/140 |

Primary Examiner—William M. Shoop, Jr.
Assistant Examiner—Brian K. Young
Attorney, Agent, or Firm—Fulwider, Patton, Rieber, Lee & Utecht

[57] ABSTRACT

Raw feature sensors are arranged in rank order for sensing raw features which exceed a respective set of raw feature values. Each raw feature sensor determines if a feature exists which falls within its range. The raw feature sensors have ranges which are exponentially separated by a constant factor, which may be chosen to allow easy approximate calculation of small integer ratios or other important ratios. A contrast-enhancer may be used in the case of visual data to improve the operation of the raw feature sensors. A ratio-detector network is repsonsive to the raw feature sensors and calculates ratios of the raw feature data. The ratio-detector network pairwise ANDs each possible pair of results from the raw feature sensors and combines these pairwise AND results with OR gates to generate a set of outputs, each of which indicates the detection of a single ratio.

11 Claims, 2 Drawing Sheets

VISUAL/VOICE INPUT RECOGNITION SENSOR

BACKGROUND OF THE INVENTION

1. Field of the Invention

The present invention relates to the field of computer system input sensors. More specifically, it relates to the field of computer system input sensors for recognition systems employing natural senses such as sight and hearing.

2. Description of Related Art

Visual and voice signals provide a rich source of input data commonly available in the world. Human beings are able to take advantage of visual and voice data to a degree that computer systems are not. Because of the richness of the input data which visual and voice signals provide, it would be a major advance in the art to provide computer systems with an efficient means for utilizing visual and voice data, and for obviating the many difficulties which attend such uses.

One reason that visual/voice signals are difficult to utilize is that they are often buried in a background of extraneous data superfluous information which is generally irrelevant to the task at hand. For example, syntactic and semantic meaning of a written word are not generally dependent on its size, color orientation, or font style. Human beings are quite adept at filtering out this and other irrelevant material; computer systems, however, must first filter out the irrelevant material and then engage in some form of recognition to assign meaning to the available data.

One possible approach to recognition is for the computer system to record all possible input patterns of input data which have meaning, and to compare incoming input data with these stored patterns to detect a meaningful input. While this method does accomplish its goal of detecting meaningful inputs, it is generally wasteful both of computer storage space and of computer processing power. Another possible approach to recognition is for the computer system to record only certain representative patterns of input data which have meaning, and to engage in a pattern matching procedure to determine the best fit between the input data and the set of meaningful inputs. While this method does accomplish its goal of detecting meaningful inputs, it can be subject to difficulty when the input visual signal differs greatly in size or orientation, or when the input voice signal differs greatly according to speaker.

The present invention obviates these problems by concentrating attention on the ratios of input feature data, rather than the raw feature data itself. In the case of voice data, this has the advantage of eliminating distinctions in the input data which are based on who is speaking, rather than on what is being spoken. In the case of visual data, this has the advantage of erasing distinctions in the input data which are based on orientation, size, or precision of data.

Accordingly, it is an object of the present invention to provide an improved method for visual and voice input feature recognition.

It is another object of the present invention to provide an improved device for calculating ratios of raw feature data.

These and other objects of the present invention will be clear after an examination of the drawings, the description, and the claims herein.

SUMMARY OF THE INVENTION

Raw feature sensors are arranged in rank order for sensing raw features whose magnitudes exceed a respective set of raw feature values. Each raw feature sensor determines if a feature exists which falls within its range. The raw feature sensors have ranges which are separated by a constant exponential factor, which may be chosen to allow easy approximate calculation of small integer ratios or other important ratios. A ratio-detector network is responsive to the raw feature sensors and detects particular ratios of the raw feature data, by pairwise comparing results from the raw feature sensors and combining comparisons associated with a particular ratio as a single one of a set of outputs.

DESCRIPTION OF THE PREFERRED EMBODIMENT

Figure 1:
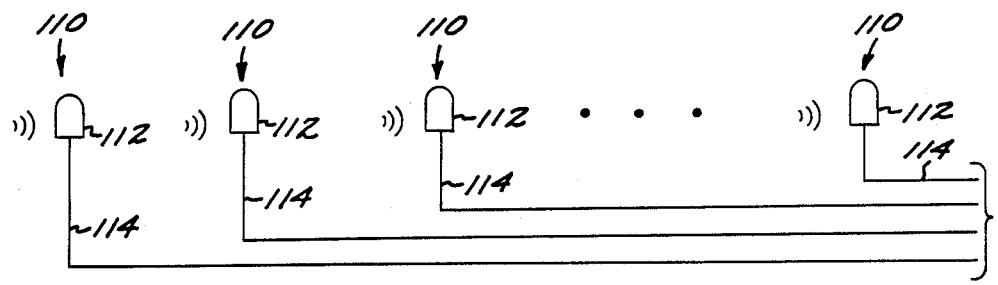
FIG. 1 is a block diagram of an arrangement of raw feature sensors for voice input.

FIG. 1 is a block diagram of an arrangement of raw feature sensors for voice input. An ensemble of raw feature sensors 110 are adapted to each detect a specific item of raw feature data. In the case of voice data, each raw feature sensor 110 may be assigned to detect a particular frequency, and may comprise a band pass filter 112 with a mean pass frequency F (i.e., one mean pass frequency F per raw feature sensor 110) and a pass frequency range $\{F-\Delta F, F+\Delta F\}$. In a preferred embodiment of the invention, the overlap of pass frequency ranges is not more than about 5-10% of the total pass frequency range for each raw feature sensor 110.

In a preferred embodiment, pass frequencies are arranged in a sequence, with the lowest pass frequency equal to a predetermined base value R, and each successive pass frequency equal to a predetermined multiple of Y of the preceding pass frequency, thus RY, $RY^2$, $RY^3$, etc. Each raw feature sensor 110 generates a signal on a line 114 which indicates the presence of a sufficient feature signal within its assigned range. Such a signal is called a "feature signal". Thus, when ratios of feature signal are detected, ratios of features with raw frequencies approximately Y, $Y^2$, $Y^3$ (or some other integer power of Y) will be the features of interest detected. Output signal lines 114 are collected into a sensor bus 116 for processing by a ratiodetector network 400 (further disclosed with reference to FIG. 4).

In a preferred embodiment, the predetermined multiple of Y may be 2 to the 1/12 power (i.e. $2^{1/12}$). This number is chosen because its integer powers are quite close in value to ratios of small integers, as shown in the table below. Of course, it will be clear to one of ordinary skill in the art that if integer powers of $2^{1/12}$ exhibit these properties, so will certain integer powers of $2^{1/24}$, $2^{1/36}$, and similar values. It is desirable to choose a multiple whose integer powers are close in value to ratios of small integers, because this facilitates detection of features of interest which involve these ratios. Ratios of small integers are well known to be common in nature, both in visual and in voice input data.

| POWERS OF Y = $2^{1/12}$ | | | | | |
|---|---|---|---|---|---|
| n | $Y^n$ | Approx. Ratio | n | $Y^n$ | Approx. Ratio |
| 1 | 1.059 | 18:17 | 7 | 1.498 | 3:2 |
| 2 | 1.122 | 9:8 | 8 | 1.587 | 8:5 |
| 3 | 1.189 | 6:5 | 9 | 1.682 | 5:3 |
| 4 | 1.260 | 5:4 | 10 | 1.782 | 9:5 |
| 5 | 1.335 | 4:3 | 11 | 1.888 | 17:9 |
| 6 | 1.414 | 7:5 | 12 | 2.000 | 2:1 |
| 13 | 2.119 | 17:8 | 19 | 2.997 | 3:1 |
| 14 | 2.245 | 9:4 | 20 | 3.175 | 16:5 |
| 15 | 2.378 | 12:5 | 21 | 3.364 | 10:3 |
| 16 | 2.520 | 5:2 | 22 | 3.564 | 18:5 |
| 17 | 2.670 | 8:3 | 23 | 3.775 | 15:4 |
| 18 | 2.828 | 14:5 | 24 | 4.000 | 4:1 |

Figure 2A:
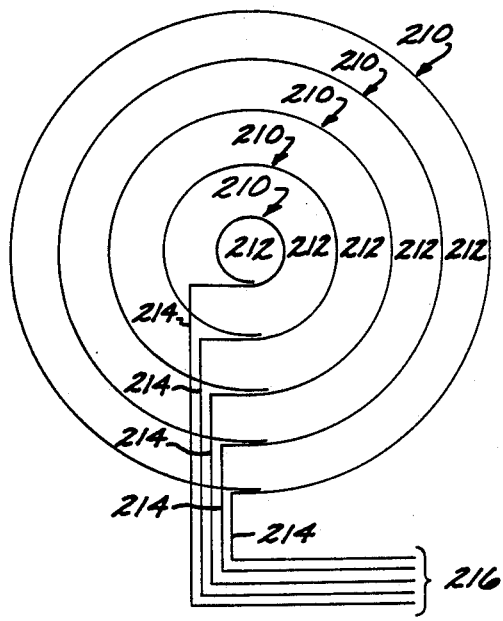
FIG. 2A is a block diagram of an arrangement of raw feature sensors for visual input.

FIG. 2A is a block diagram of an arrangement of raw feature sensors for visual input. In the case of visual data, each raw feature sensor 210 is assigned to detect a visual bright point a particular distance D (i.e., one particular distance D per raw feature sensor 210) from the visual center of an object in view, and may comprise an optical sensor 212 sensitive to unusually bright points within a range $\{D-\Delta D, D+\Delta D\}$ of distances from the visual center of the object in view. The concept of "visual center" is well-known in the art, and thus the means of centering the sensor on the visual center of the object in view is not further disclosed here. For example, computer-executed centering programs are well-known in the art and are generally effective.

In a preferred embodiment, the distances are arranged in a sequence with the lowest distance equal to a predetermined base value R, and each successive distance equal to a predetermined multiple Y of the preceding distance, thus RY, $RY^2$, $RY^3$, etc. Each optical sensor 212 generates a signal on a line 214 which indicates the presence of a feature within its assigned range. Such a signal is called a "feature signal." Thus, when ratios of feature signal are detected, ratios of features with raw distances of approximately Y, $Y^2$, $Y^3$, (or some other integer power of Y) will be the features of interest detected. Output signal lines 214 are collected into a sensor bus 216 for processing by a ratio-detecting network (further disclosed with reference to FIG. 4).

Figure 2B:
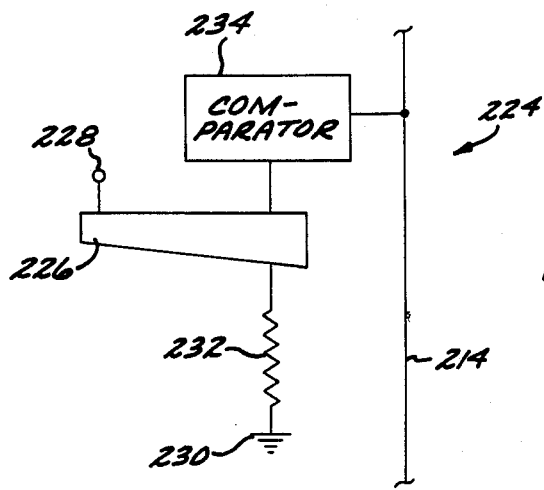
FIG. 2B is a circuit diagram of a part of a single raw feature sensor for visual input.

FIG. 2B is a circuit diagram of a part of a single raw feature sensor for visual input. In a preferred embodiment, each optical sensor 212 may comprise a set of optical sensing segments 224, each including a truncated pie-slice shaped photoconductor 226. Each optical sensing segment 224 may comprise a photoconductor 226, electrically connected to a voltage source 228 and to ground 230 through a load resistor 232. The voltage across the load resistor 232 is compared with a threshold value by a comparator 234, whose sensitivity is inversely proportional to the area of the truncated pie-slice segment. When the threshold of the comparator 234 is exceeded, a logic "1" is transmitted as an output signal on an output signal line 214. To determine the dominant ratio or ratios, the thresholds of all comparators 234 may be proportionately increased or decreased.

Figure 3:
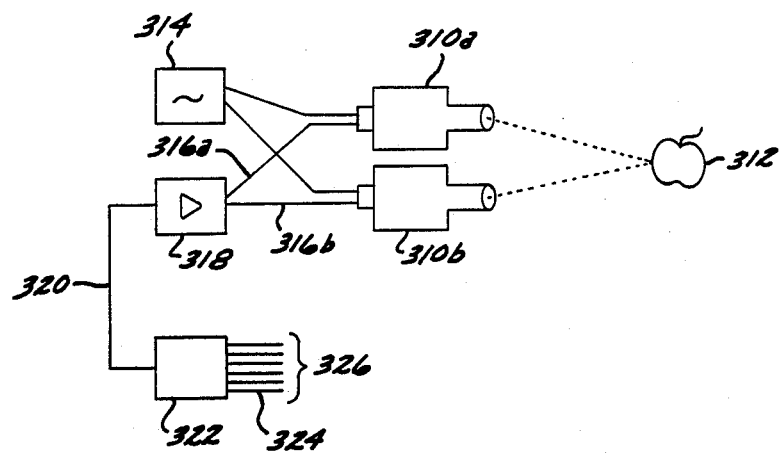
FIG. 3 is a block diagram of a second possible arrangement of raw feature sensors for visual input.

FIG. 3 is a block diagram of second possible arrangement of raw feature sensors for visual input. In this second possible arrangement, a raw feature sensor system is arranged to detect intersections or termination of light-dark boundaries, such as many be found in common letters or in simple line drawings. Twin video cameras 310a-b are directed toward the same object in view 312, so that the images generated by each of them would ordinarily be identical. One camera 310a is sharply focused, while the other camera 310b is somewhat out of focus. The two video cameras 310a-b are electrically connected to the same scanning and timing circuit 314, as is well-known in the art, and their outputs are presented on lines 316a-b to an analysis circuit 318. The analysis circuit 318 differentially amplifies the two signals and subtracts one signal from the other, as is well-known in the art, thus generating a combined signal on line 320 which enhances contrast margins in the picture of the object in view. (Alternately, a contrast control from a standard television camera could be used to extract an input signal which is indicative of contrast points in the picture of the object in view.) The combined signal on line 320 is demultiplexed by a demutliplexor 322 to produce multiple raw feature signals on output signal lines 324. Output signal lines 324 are collected into a sensor bus 326 for processing by a ratio-detecor network 400 (further disclosed with reference to FIG. 4).

Figure 4:
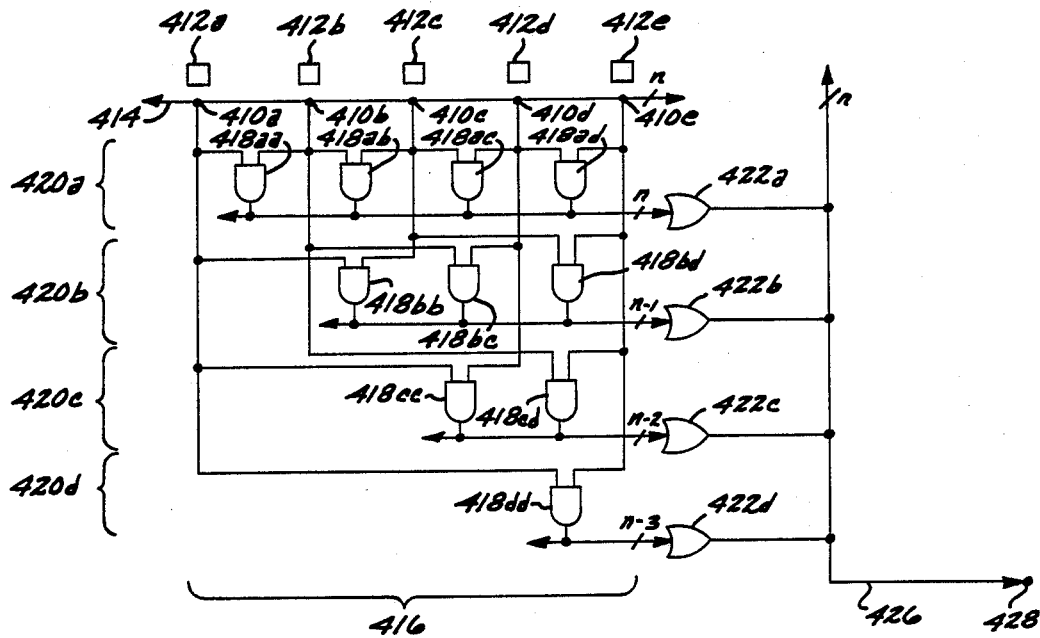
FIG. 4 is a block diagram of a digital logic circuit for calculating ratios of raw feature data.

FIG. 4 is a block diagram of an arrangement of digital logic for detecting particular ratios of the raw feature data. A plurality of input data ports 410a-z receives a pattern of input data bits 412, comprising one input data bit 412a-z per input port 410a-z, from a signal bus 414 (which may comprise an output signal bus 116, 216 or 326 of a set of raw feature sensors). The input data pattern is input to a ratio-detector network 416 of AND gates 418 for detecting the presence of ratios of feature signal arranged in a sequence of rows 420 (e.g. 420a-z). Each AND gate 418 (e.g. 418aa-az) in a first row of AND gates 420a is electrically connected to respond to each pair of input data bits 412 (e.g. 412a, 412b) which are separated by one bit. Thus, the first row 420a of AND gates 418aa-az is responsive to adjacent pairs of input data bits 412 (e.g. 412a and 412b, 412b and 412c, 412c and 412d). Similarly, each AND gate 418ba-bz in a second row 420b of AND gates is electrically connected to respond to each pair of input data bits 412 (e.g. 412a, 412c) which are separated by two bits. Additional rows 420c-z of AND gates 418 comprise AND gates 418cc-zz which are electrically connected to respond to each pair of input data bits 412 which are separated by three bits (e.g. 412a, 412d) in the third row 420c, by four bits (e.g. 412a, 412e) in the fourth row 420d, etc.

Each AND gate 418 (e.g. 418aa-az) in each row of AND gates 420 (e.g. 420a) is electrically connected to carry its output to a respective ratio-detector OR gate 422 (e.g. 422a). Thus, each ratio-detector OR gate 422 has an output on a line 424 which indicates the presence of a particular ratio feature signal in at least one pair of sensors. The outputs of the ratio-detector OR gates 422a-z, on lines 424, are collected to form a ratio-detector network output signal bus 426 and electrically connected to output ports 428.

The ratio-detector network output signal bus 426 thus carries signals which indicate the presence of specific ratios in the feature signals, detected by the raw feature sensors disclosed above. Ratios close to Y, $Y^2$, $Y^3$, etc., where $Y=2^{1/12}$, have been chosen in preferred embodiment for their utility in detecting interesting features in visual and voice detection systems, but it will be clear to one of ordinary skill in the art that other and further feature signal ratios may be detected as well. One example use of the present invention is to produce input data for the invention disclosed in our co-pending U.S. patent application entitled, "PARALLEL ASSOCIATIVE MEMORY SYSTEM", filed Jan. 7, 1987 and assigned Ser. No. 001,233, hereby incorporated by reference.

While a presently preferred embodiment has been detailed, many variations are possible which remain within the scope of the present invention.

Other and further information may also be found in disclosure document 137,452, filed May 5, 1985 and disclosure document 148,374, filed Apr. 3, 1986, both by the same inventor and both thereby incorporated by reference as if fully set forth herein.

I claim:

1. A circuit for detecting the presence of feature signal ratios in a pattern of input data bits, comprising:
   (a) a plurality of input data port means, each for receiving an element of said pattern of input data bits;
   (b) a plurality of ratio detector means, each for detecting the presence of a predetermined feature signal ratio in said pattern of input data bits, and for generating a ratio detector output signal in response thereto, each comprising:
      (1) a plurality of first logic function means, each responsive to a pair of elements related by said predetermined feature signal ratio, for detecting the presence of said predetermined feature signal ratio in said pattern of input data bits, and for generating an intermediate output signal in response thereto;
      (2) a second logic function means, responsive to said intermediate output signals from said plurality of first logic function means, for detecting at least one positive intermediate output signal, and for generating said ratio detector output signal in response thereto; and
   (c) a plurality of output port means for transmitting said ratio detector output port means for transmitting said ratio detector output signals generated by said plurality of ratio detector means.

2. A circuit as claimed in claim 1, wherein said first logic function means comprises an AND gate.

3. A circuit as claimed in claim 1, wherein said second logic function means comprises an OR gate.

4. A sensor for detecting speech elements, comprising a plurality of frequency sensors, each responsive to a band of input frequencies, for generating a pattern of input data bits; and
   a circuit for detecting the presence of feature signal ratios in said pattern, comprising
   a plurality of input data ports means, each for receiving an element of said pattern; a plurality of ratio detector means, each for detecting the presence of a predetermined feature signal ratio in said pattern, and for generating a ratio detector output signal in response thereto; and
   a plurality of output port means for transmitting said ratio detector output signal.

5. A sensor as claimed in claim 4, wherein said bands of input frequencies are organized into a series of said bands of input frequencies, wherein the mean of each said band of input frequencies is a predetermined multiple of the mean of its predecessor band of input frequencies.

6. A sensor as claimed in claim 5, wherein said predetermined multiple is substantially equal to a rational fractional power of 2.

7. A sensor as claimed in claim 5, wherein said predetermined multiple is substantially equal to an integer power of $2^{(1/12)}$.

8. A sensor for detecting picture elements, comprising a plurality of picture sensors, each responsive to a band of input radii, for generating a pattern of input data bits; and
   a circuit for detecting the presence of feature signal ratios in said pattern of input data bits, comprising
   a plurality of input data port means, each for receiving an element of said pattern,
   a plurality of ratio detector means, each for detecting the presence of a predetermined feature signal ratio in said pattern, and for generating a ratio detector output signal in response thereto, and
   a plurality of output port means for transmitting said ratio detector output signals.

9. A sensor as claimed in claim 8, wherein said bands of input radii are organized into a concentric series of said bands, wherein the radius of each said band is a predetermined multiple of the radius of its predecessor band.

10. A sensor as claimed in claim 9, wherein said predetermined multiple is substantially equal to a rational fractional power of 2.

11. A sensor as claimed in claim 9, wherein said predetermined multiple is substantially equal to a integer power of $2^{(1/12)}$.

* * * * *